United States Patent

[11] 3,626,270

[72] Inventors Wilford B. Burkett
 Pacific Palisades;
 John H. Bigbee, III, Los Angeles, both of Calif.
[21] Appl. No. 21,438
[22] Filed Mar. 20, 1970
[45] Patented Dec. 7, 1971
[73] Assignee McCulloch Corporation
 Los Angeles, Calif.

[54] BATTERY CHARGER FOR SINGLE CELLS
 13 Claims, 9 Drawing Figs.
[52] U.S. Cl. .................................................. 320/35, 320/5, 320/14, 320/40
[51] Int. Cl. ...................................................... H02j 7/10
[50] Field of Search ............................................ 320/4, 5, 20, 21, 22, 35, 36, 37, 38, 39, 40, 51, 53, 14, DIG. 2, DIG. 1

[56] References Cited
 UNITED STATES PATENTS

| | | | |
|---|---|---|---|
| 2,619,624 | 11/1952 | Briggs, Jr. ...................... | 320/14 |
| 2,689,322 | 9/1954 | Godshalk et al. ............... | 320/35 X |
| 2,935,675 | 5/1960 | Ferguson et al. ................ | 320/4 |
| 3,252,070 | 5/1966 | Medlar et al. ................... | 320/DIG. 2 |
| 3,418,553 | 12/1968 | Potter ............................. | 320/DIG. 1 |
| 3,421,068 | 1/1969 | Van Marter ..................... | 320/35 X |
| 3,457,489 | 7/1969 | Gentry, Jr. et al. .............. | 320/35 X |
| 3,465,230 | 9/1969 | Ball ................................ | 320/35 X |
| 3,517,293 | 6/1970 | Burkett et al. ................... | 320/14 |
| 3,534,241 | 10/1970 | Wilson et al. .................... | 320/33 |

FOREIGN PATENTS

| | | | |
|---|---|---|---|
| 1,156,883 | 4/1967 | Great Britain .................. | 320/35 X |

Primary Examiner—J. D. Miller
Assistant Examiner—John M. Gunther
Attorney—Christie, Parker & Hale ABSTRACT: A method and circuit for rapid charging batteries, and in particular single cells wherein a battery is charged by imparting a progressively increasing charge to the battery by subjecting the battery to alternating charging and discharging intervals after a first interval in which a net discharge takes place through a path including a thermal switch which opens the current path in response to current flow therethrough. During a charging interval charge current pulses are applied to the battery being charged through a current path including a unilateral impedance element, such as a silicon-controlled rectifier, and during each discharge interval, a charge-discharge path is applied in parallel with the unilateral impedance element to effect a net discharge of the battery. The rapid charging of the battery is terminated by monitoring a terminal characteristic of the battery such as the quiescent battery terminal voltage or the temperature of the battery being charged and converting to a trickle charge in response to the attainment of a predetermined value of the monitored terminal characteristic.

Fig_1
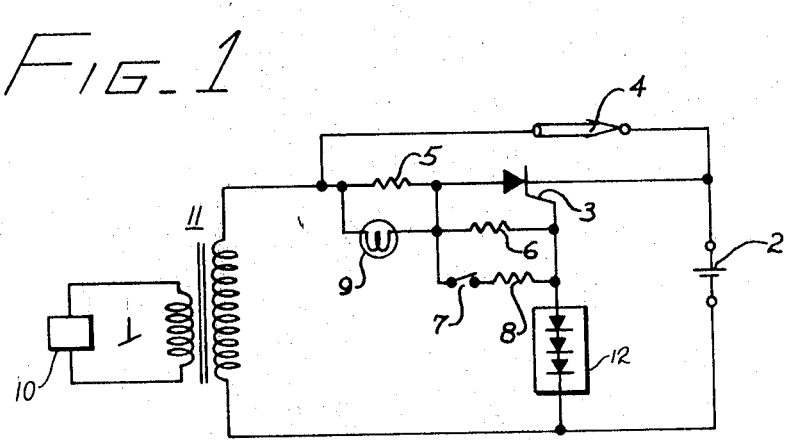
Fig_9
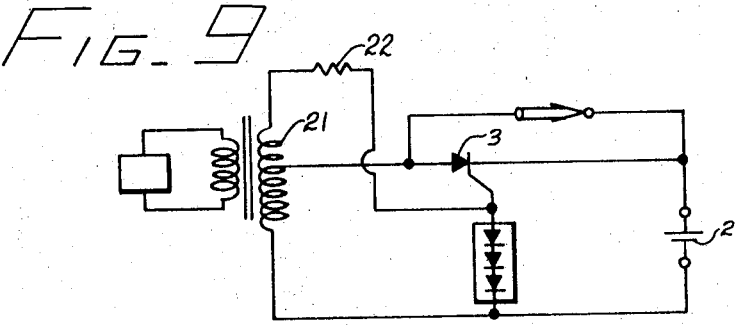
Fig_8
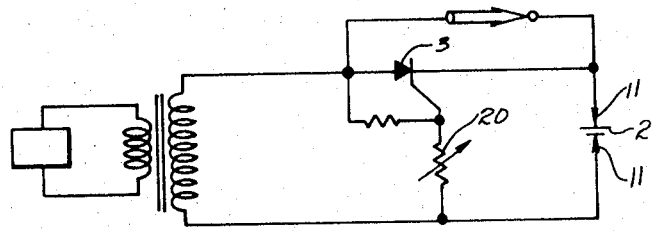
Fig_7
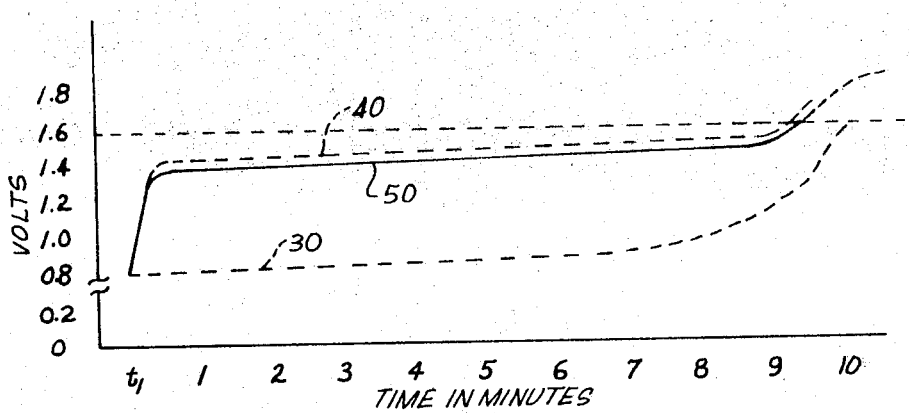

SOURCE VOLTAGE

CURRENT DURING DISCHARGE INTERVAL

BATTERY VOLTAGE DURING DISCHARGE INTERVAL

BATTERY VOLTAGE DURING CHARGE INTERVAL

3,626,270

BATTERY CHARGER FOR SINGLE CELLS

BACKGROUND OF THE INVENTION

Field of the Invention

This invention relates to a method and circuit for rapid charging batteries, and in particular for the rapid charging of single cells.

Most of the present battery chargers are relatively complex and expensive and have circuit components that require a voltage that is not compatible with the nominal output voltage of a single cell for single-cell operation. In particular, charging single nickel cadmium cells poses some new problems not encountered with battery packs with two or more cells. The cell terminal voltage together with saturation voltages of available semiconductors, make deep discharge pulsing which is desirable for rapid charging of batteries with solid state circuits, impractical. Additionally, the cell terminal voltage at which rapid charging should be terminated to prevent damage to the cell must be sensed within closer tolerance ranges than the terminal voltage for multicell battery packs. Circuitry for terminating charging in response to the attainment of a predetermined terminal characteristic within small ranges is disclosed in our concurrently filed application Ser. No. 21,430 entitled "Charging of Batteries" and assigned to the same assignee as this application.

SUMMARY OF THE INVENTION

The method of the present invention is particularly adapted to the charging of single cells and comprises the steps of imparting a progressively increasing charge to the battery made up of one or more cells by subjecting the battery to alternating charging and discharging intervals after a first interval. The steps include initially applying a charge-discharge path to the battery during the first interval, applying a charge path during each of the charging intervals, and applying a charge-discharge path having a circuit means for opening the path in response to current flow through the path during each of the discharging intervals.

The rapid charging circuit of the present invention has relatively few components and is consequently relatively inexpensive to manufacture.

In accordance with the present invention a rapid battery charging circuit comprises a charge path having means for rectifying an alternating-current voltage with the path being connected between a source of alternating-current voltage and the battery to be charged. The circuit further comprises a charge-discharge path having a thermal-responsive element in the current path therethrough with the charge-discharge path being connected in parallel with the rectifying means of the charge path. The rectifying means may advantageously be a silicon controlled rectifier having its anode-cathode path connected between a source of charge current pulses and the battery to be charged, with the circuit further including a circuit for clamping the gate of the silicon-controlled rectifier at predetermined voltage.

The clamping circuit cooperates with the thermal characteristic of the silicon-controlled rectifier, and in particular, the gate sensitivity which varies as the temperature of the silicon-controlled rectifier varies, to terminate the rapid charging of the battery upon the attainment of a predetermined terminal characteristic of the battery, such as the quiescent terminal voltage. Alternatively, the rapid charging of the battery may be terminated by employing a thermistor in the gate circuit of the silicon-controlled rectifier with the thermistor being mounted in thermal proximity to the battery being charged so that it will sense the temperature of the battery as the charge progresses.

In the battery-charging circuit employing a clamping circuit the clamping circuit may advantageously comprise a forward reference diode. For purposes of compensation for different ambient temperatures at which the charger operates and for variation in input voltage, a small resistance is connected in the anode-cathode path of the silicon-controlled rectifier and the forward reference diode, the silicon-controlled rectifier and the small resistor are mounted in thermal proximity to each other.

BRIEF DESCRIPTION OF THE DRAWINGS

The above and other features and advantages of the present invention may be understood more fully and clearly by consideration of the following specification and the attached drawing in which:

FIG. 1 is a schematic diagram of a rapid charging circuit in accordance with the present invention;

FIG. 7 is a chart representatively depicting the variation in battery terminal voltage as charge progresses during the charging of a battery in accordance with the method and circuit of the present invention; and FIGS. 8 and 9 are schematic diagrams of alternative embodiments of the rapid charging circuit of the present invention.

DESCRIPTION OF THE PREFERRED EMBODIMENTS

Figure 2:
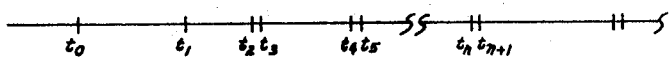
FIG. 2 is a chart pictorially depicting the time relationship of the first interval, the charging intervals, and the discharging intervals in accordance with the method and circuit of rapid charging of the present invention.

The preferred embodiment of the circuit for rapid charging a battery, and in particular a single cell, by alternately applying charge current pulses during a charging interval through a first path having a controllable unilateral impedance element, and applying an alternating-current voltage through an intermittently operable path in parallel with the unilateral impedance element during a discharge interval, to progressively charge a battery, is shown schematically in FIG. 1 of the drawing.

The circuitry includes a first path between a source 1 of charging current pulses and a battery 2 to be charged. The path includes a unilateral impedance element 3 representatively shown as a silicon-controlled rectifier having its cathode connected to the positive terminal of the battery 2. A second path is connected in parallel with the silicon-controlled rectifier 3 and includes a thermal switch 4. The thermal switch 4 is connected across the silicon-controlled rectifier 3 and a resistor 5 which is connected to the anode of the silicon-controlled rectifier 3.

The triggering circuit for the silicon-controlled rectifier 3 includes a resistor 6 connected between the anode and gate of the silicon-controlled rectifier 3 and a series-connected switch 7 and a resistor 8 connected across the resistor 6 between the anode and gate of the silicon-controlled rectifier 3. An indicating lamp 9 is connected across the resistor 5 in the current path of the silicon-controlled rectifier 3.

The source 1 of charging current pulses may advantageously be provided by the commercial 115-volt alternating-current voltage representatively shown by block 10. A transformer 11 is connected in the source circuit to provide the correct voltage for the battery being charged. For example, if a single cell is being charged the transformer 11 will be a stepdown transformer to provide the proper charge voltage.

A circuit for terminating the rapid charging of the battery in response to the attainment of a selected terminal characteristic, such as voltage, temperature, or pressure of the battery being charged, is shown in FIG. 1. This terminating circuit includes a forward reference diode 12 connected between the gate of the silicon-controlled rectifier 3 and the negative terminal of the battery 2. This terminating circuit and other terminating circuits for terminating the charge of a battery, and in particular of a single cell, in response to the attainment of a predetermined value of one of the terminal characteristics of the battery being charged, is the subject of the above-referred-to concurrently filed application Ser. No. 21,430 entitled "Charging of Batteries."

In one illustrative nonlimiting application the battery 2 to be charged was a one-third AA sealed nickel cadmium cell; silicon controlled rectifier 3 was a Motorola 2N5060; resistor 5 was a 1-ohm resistor, resistor 6 was a 1,000-ohm resistor; resistor 8 was a 100-ohm resistor; thermal switch 4 was a bimetal thermally actuated circuit breaker manufactured by Sylvania and identified by the designation MB332; forward reference diode 12 as a Motorola MZ2362 diode, and the transformer 11 had a turns ratio of 38:1 to step down the 115 volts from source 10 to a secondary voltage of approximately 3 volts open circuit.

In operation, the source voltage from source 10 is applied to the charger and the battery 2 to be charged is connected to the charger; either operation being first. Thermal switch 4 is initially closed so that during an initial interval current flows through the switch 4 into the battery 2 when the source voltage exceeds the battery voltage and has the proper polarity. During the remainder of the time the battery 2 discharges through the thermal switch 4 and the secondary of the transformer 11. The discharge of the battery is aided during each alternate half-cycle of the source voltage from source 10 so that a deep discharge pulse occurs.

The effective current in both directions through thermal switch 4 heats the bimetal breaker element causing its contacts to open in approximately one-half to 1 second. This initial interval is depicted in FIG. 2 between the time $t_0$ and $t_1$. During this initial interval the battery is further discharged before a net charge takes place by the application of charging current during a charging interval.

After the opening of thermal switch 4 the battery 2 will be charged during a charging interval by current flowing through silicon controlled rectifier 3. If the terminal voltage of battery 2 is sufficiently low or if the silicon-controlled rectifier 3 is sufficiently warm, the silicon-controlled rectifier will receive adequate gate current through resistor 6 to fire and conduct so long as the secondary voltage of transformer 11 exceeds the terminal voltage of the battery 2. If the ambient temperature of the charger is low, such that the gate sensitivity of the silicon-controlled rectifier 3 is low and insufficient current flows through the relatively large resistor 6 to turn on the silicon-controlled rectifier 3, switch 7 may be closed to provide a lower resistance path for the gate current of silicon-controlled rectifier 3. This switch 7 need only be closed when the charger is cold because the silicon-controlled rectifier 3 begins to warm up as soon as current flows through it. Thereafter, the gate sensitivity is such that the current through the larger resistor 6 will be sufficient to trigger the silicon controlled rectifier 3 on.

The operation of the circuit of FIG. 1 is representatively shown by the chart in FIG. 2. After the initial interval the battery will be charged by subjecting the battery to alternating charging and discharging intervals. The charging intervals take place when the thermal switch 4 is open, as representatively shown on the chart as the intervals $t_1-t_2$, $t_3-t_4$, $t_{n+1}-t_{n+2}$, etc., and the discharging intervals when the thermal switch 4 is closed, as representatively shown on the chart as the intervals $t_2-t_3$, $t_4-t_5$, $t_n-t_{n+1}$, $t_{n+2}-t_{n+3}$, etc.

The variation in the terminal voltage of the battery during charge is representatively shown in FIG. 7. For illustrative purposes, it is assumed that the single one-third AA sealed nickel cadmium cell has an initial voltage of approximately eight-tenths volt as shown at time $t_1$ on FIG. 7. Upon the application of the charging current to the battery 2 the terminal voltage very rapidly rises to approximately 1.3 volts and thereafter gradually increases as the charge progresses. The terminal voltage will have another rapid rise in accordance with the method of the present invention as the battery approaches the full-charge condition. With the alternating charging and discharging intervals, the rapid rise of the quiescent terminal voltage, i.e., the battery voltage when no charge current is flowing during a charge interval, is a good indicator of the state of charge of the battery and may be employed to indicate the selected state of charge.

In the illustrative example, the single one-third AA cell is charged to a quiescent terminal voltage of 1.55 volts which represents a charge level of substantially rated capacity for the cell.

Figure 3:
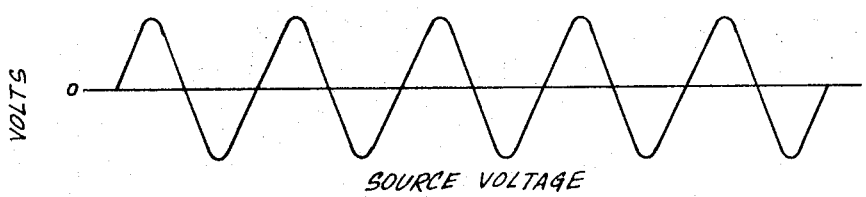
FIG. 3 is a chart depicting the alternating-current voltage from the source applied to the rapid charging circuit of FIG. 1.
Figure 4:
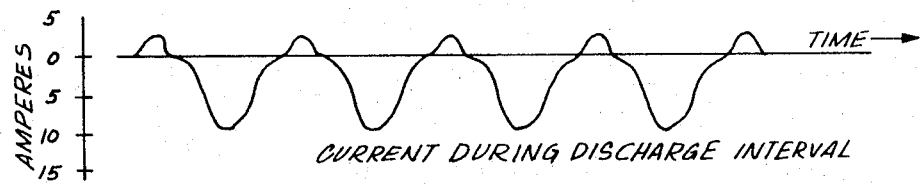
FIG. 4 is a chart representatively depicting the current that flows during the discharging interval in the rapid charging circuit of FIG. 1.
Figure 5:
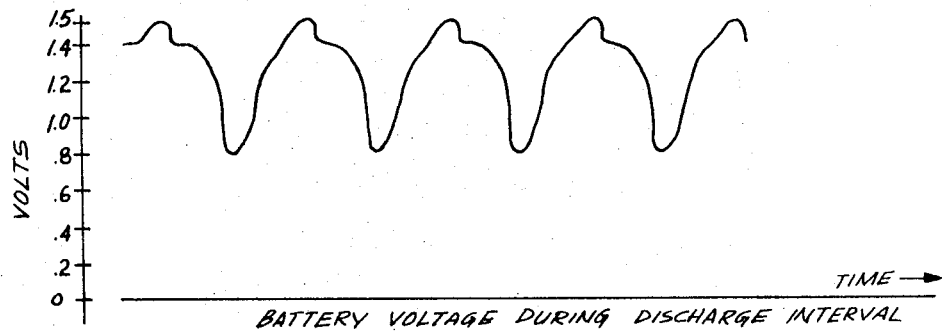
FIG. 5 is a chart representatively depicting the battery terminal voltage during a discharging interval for the rapid charging circuitry of FIG. 1.

The terminal voltage of the battery during charge in accordance with the method and circuit of the present invention, will vary between the bottom dotted line 30 and the middle dotted line 40 of FIG. 7 about the quiescent voltage representatively shown by the solid curve 50. The terminal voltage of the battery approaches the bottom dotted line 30 during the discharge interval and approaches the middle dotted line 40 while charge current is flowing. The variation in terminal voltage of the battery is shown on an enlarged scale in FIG. 5 during a discharge interval, and in FIG. 6 during a charge interval. The current flow during a discharge interval is depicted in FIG. 4 with the timing of the peaks of current and voltage of FIGS. 4, 5 and 6 being referenced to the waveform of the source voltage representatively shown in FIG. 3.

Figure 6:
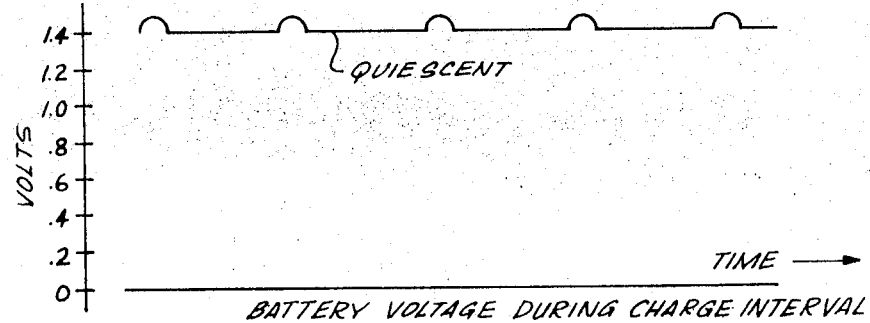
FIG. 6 is a chart representatively depicting the battery terminal voltages during a charging interval for the rapid charging circuitry of FIG. 1.

During a charging interval, charge current will flow into the battery 2 through the silicon-controlled rectifier 3 when the voltage across the secondary of the transformer 11 exceeds the battery terminal voltage. Thereafter, the battery terminal voltage will increase while charge current is flowing as representatively shown in FIG. 6. When no current is flowing during a charging interval, the battery terminal voltage will decrease to a stable level which is termed the quiescent voltage as shown in FIG. 6 and as representatively shown by curve 50 in FIG. 7.

During a discharge interval the terminal voltage of the battery will increase when charge current is flowing through thermal switch 4 which occurs when the voltage across the secondary of transformer 11 exceeds the terminal voltage of the battery. This condition is represented by the positive peaks on the cure of FIG. 5. Similarly, the charge current is shown as the positive peaks in FIG. 4. During the negative half-cycle of the voltage across the secondary, that is, when the bottom terminal of the secondary of transformer 11 is positive, the secondary voltage is in series-aiding with the battery terminal voltage so that a large discharge current flows out of the battery through the thermal switch 4 and the secondary of the transformer 11. This is representatively shown by the current below the reference line in FIG. 4, which current has a peak value of approximately 8 amperes.

A one-third AA sealed nickel cadmium cell having a rated capacity of 125 milliamperes hours and a nominal voltage of 1.2 volts has a C-rate of approximately 125 milliamperes, where C is the amperage of the current at which the cell is discharged in rating the cell to a selected end voltage in a selected period of time, which is generally 1 hour or 10 hours. For example, the one-third AA nickel cadmium cell has a C-rate of 125 milliamperes whereby a selected end voltage is attained in 1 hour. Thus, it is seen from the curve of FIG. 4 that the charge current substantially exceeds the C-rate as does the discharge current for the circuit of FIG. 1.

When the voltage between the gate of the silicon-controlled rectifier 3 and the negative terminal of the battery 2 exceeds some selected value, such as 2.1 volts for the forward reference diode MZ2362 of the illustrative example, the forward reference diode 12 conducts and precludes further rise of the gate potential. The quiescent terminal voltage of battery 2 determines the potential at the cathode at the silicon-controlled rectifier 3 with respect to its gate. Until the terminal voltage of the battery 2 rises to the level indicating the selected state of charge the gate potential of the silicon controlled rectifier rises each positive half-cycle with respect to the cathode enough to fire the silicon-controlled rectifier 3. When the battery 2 has attained the selected state of charge, as indicated by a predetermined terminal voltage, the gate potential of the silicon-controlled rectifier 3 clamped by the reference diode 12 does not rise sufficiently with respect to the cathode clamped by the terminal voltage of the battery 2 to fire the silicon-controlled rectifier 3 and rapid charging of the battery is terminated. However, prior to the automatic shut off of rapid charging a phenomenon involving the dependence of the gate sensitivity of silicon-controlled rectifier 3 on the temperature of the silicon-controlled rectifier takes place.

In the circuit of FIG. 1 the thermal switch 4 is initially closed for an initial interval as discussed above, and current flow therethrough until the switch is sufficiently heated to open. This is represented by time $t_1$ in FIG. 2 which ends the first interval. Thereafter, a charge interval begins which extends between time $t_1$ and $t_2$ in FIG. 2. In the illustrative example, the charge interval exists between 7 and 20 seconds. During this time the thermal switch 4 cools and again closes the path around the silicon-controlled rectifier 3. Upon closing of the thermal switch 4 a discharge interval begins at time $t_2$ representatively shown in FIG. 2. This discharge interval, where a net discharge of the battery 2 takes place, lasts for approximately one-tenth to five-tenths seconds when the thermal switch 4 again opens to end the discharging interval and to begin another charge interval, which time is representatively shown as time $t_3$ in FIG. 3.

The charge interval will increase slightly in duration as charge progresses because the thermal switch 4 remains open longer as its ambient temperature increases.

The gate sensitivity of silicon-controlled rectifier 3 of the illustrative example is such that approximately one-half volt is required to fire the silicon controlled rectifier at an ambient temperature of 75° F. As the temperature of the silicon controlled rectifier 3 increases, the gate sensitivity increases such that at 170° F. only approximately 0.4 volt between the gate and cathode of the silicon controlled rectifier 3 is required to turn on the rectifier.

As the terminal voltage of the battery 2 begins to rapidly increase as the full-charge condition is approached, the silicon controlled rectifier 3 fires later in the cycle on successive cycles of input voltage from the source 10. As a consequence of later firing, the current through the silicon-controlled rectifier 3 decreases and the rectifier begins to cool. As a consequence of the cooling of the silicon-controlled rectifier 3 the gate sensitivity decreases so that a higher gate-to-cathode voltage is required to turn on the silicon-controlled rectifier 3. This higher gate-to-cathode also causes the silicon-controlled rectifier 3 to fire later in each successive cycle, causing the silicon controlled rectifier 3 to cool even more which results in a regenerative cutoff control function of the silicon-controlled rectifier 3.

While charge current is flowing during each charging interval, lamp 9 is lit indicating the rapid charging state of the charger. However, when the terminal voltage of the battery 2 reaches the predetermined value such that the silicon-controlled rectifier 3 will no longer turn on, the indicator lamp 9 goes off, indicating the termination of rapid charging of the battery 2. At this point the cell or the battery 2 may be removed and used. However if the battery 2 is left in place of the battery will discharge through the thermal switch 4 and the terminal voltage of the battery will be reduced to a point where the silicon-controlled rectifier 3 may again be gated on. As soon as the charge is again restored in the battery 2 the high current charging through the silicon-controlled rectifier 3 will terminate. This intermittent high current charging for brief periods is effective as a trickle charge to maintain the battery 2 in a fully charged condition and may be continued indefinitely.

The charger circuit of FIG. 1 is advantageously operable over a wide range of ambient charger temperatures and input voltage variations. For this purpose a small-valued resistor 5 is connected in the charge current path and the silicon controlled rectifier 3 and forward reference diode 12 are mounted in thermal proximity to the resistor 5 so that all three elements are at substantially the same ambient temperature. The forward reference diode 12 clamps at a lower voltage as its temperature increases. The silicon-controlled rectifier 3 has a higher gate sensitivity as its temperature increases. As a consequence, by mounting the forward reference diode 12, the silicon-controlled rectifier 3, and the resistor 5 near each other, the firing angle for the silicon-controlled rectifier 3 is temperature compensated and the average charging current applied to the battery 2 is partially regulated against variations in line voltage produces a higher average charging current which in turn yields a high average temperature in resistor 5 and silicon-controlled rectifier 3. Heat from these components reaching the forward reference diode 12 causes it to clamp at a lower voltage. This results in delaying the angle at which the silicon controlled rectifier 3 fires, and, in turn, reduces the average charging current. Conversely, at lower line voltages charging current is less, heating of the reference diode 12 by the resistor 5 and silicon-controlled rectifier 3 is less, and the clamping voltage at the gate to the silicon-controlled rectifier 3 rises. As a result, the firing angle of the silicon-controlled rectifier 3 is lowered to yield increasing average charging current.

The charge efficiency of the charger circuit of FIG. 1 is relatively low because a large percentage of the source voltage is dropped across the silicon controlled rectifier 3. However, if the number of cells being charged is increased with a commensurate increase in the voltage of the charging current source, the efficiency may be increased since a smaller percentage of the total voltage drop would occur across the silicon-controlled rectifier.

A different terminal characteristic than quiescent terminal voltage may be monitored to terminate the rapid charging of the battery. For example, the temperature of the battery being charged may be monitored to control the termination of the rapid charging.

A circuit wherein the battery temperature terminal characteristic is monitored is schematically shown in FIG. 8. In the circuit of FIG. 8, a thermistor 20 is connected between the gate of silicon controlled rectifier 3 and the negative terminal of the battery 2 that is being charged. The thermistor is mounted in thermal proximity to the battery 2, for example, by being placed on one of the clips 11 that electrically connects the battery 2 to the charger. As the temperature of the battery increases as charge progresses the resistance of the thermistor 20 decreases to shunt more current around the gate-cathode path of the silicon-controlled rectifier 3 so that the silicon-controlled rectifier 3 will fire later in each cycle. As a consequence, the silicon-controlled rectifier 3 will have a regenerative shut off similar to the one that occurs in the circuit of FIG. 1.

The circuit of FIG. 1 may be modified as schematically shown in FIG. 9 to obviate the possibility for the need of a starting switch, such as switch 7 in FIG. 1. In the circuit of FIG. 9, a center-tapped secondary 21 is provided wherein one-half of the secondary winding is coupled to the gate of silicon-controlled rectifier 3 through resistor 22. The center tap of the secondary 21 is connected to the anode of the silicon-controlled rectifier 3 and the other half of the secondary 21 is connected to the negative terminal of the battery 2 to be charged. By this connection a sufficient gate current is always provided.

Various changes may be made in the details of construction without departing from the spirit and scope of the invention as defined by the appended claims.

What is claimed is:

1. A rapid battery-charging circuit comprising a charge path having means for rectifying an alternating-current voltage, said charge path being connected between a source of alternating-current voltage and a battery having one or more cells to be charged and, a charge-discharge path having a thermal-responsive element connected in the current path therethrough, said charge-discharge path being connected in parallel with the rectifying means of said charge path.

2. A rapid battery-charging circuit in accordance with claim 1 wherein said rectifying means is a silicon-controlled rectifier having its anode-cathode path connected between a source of alternating-current voltage and the battery to be charged, said circuit further including a circuit for clamping the gate of the silicon-controlled rectifier at a predetermined voltage.

3. A rapid battery-charging circuit in accordance with claim 2 wherein the clamping circuit comprises a forward reference diode connected between the gate of the silicon-controlled rectifier and the negative terminal of the battery to be charged, with the cathode of the silicon-controlled rectifier being connected to the positive terminal of the battery to be charged.

4. A rapid battery-charging circuit in accordance with claim 1 further including a transformer having a center-tapped secondary with the primary of the transformer being connected to a source of alternating-current voltage, wherein said rectifying means comprises a silicon-controlled rectifier connected between the center tap of the secondary of said transformer and the positive terminal of the battery to be charged.

5. A rapid battery-charging circuit in accordance with claim 4 further including a current path connected between one end of the secondary of the transformer and the gate of the silicon-controlled rectifier.

6. A rapid charging battery circuit in accordance with claim 5 further including a forward reference diode connected between the gate of the silicon-controlled rectifier and the other side of the secondary of the transformer, and means for connecting the other side of the secondary of the transformer to the negative terminal of the battery to be charged.

7. A rapid charging battery circuit in accordance with claim 1 wherein said rectifying means comprises a silicon-controlled rectifier having its anode-cathode path connected between a source of alternating-current voltage and the positive terminal of the battery to be charged, the circuit further comprising a thermistor connected between the gate of the silicon controlled rectifier and the negative terminal of the battery to be charged with the thermistor being mounted in thermal proximity to the battery to be charged so that it is responsive to the temperature of the battery being charged.

8. A circuit for rapidly charging a battery having at least one cell from an alternating-current source comprising a silicon-controlled rectifier with the anode-cathode path being connected between the alternating-current source and the battery to be charged, a voltage clamping circuit connected between the gate of said silicon-controlled rectifier and the negative terminal of the battery to be charged, a gate trigger circuit connected between the anode and the gate of the silicon-controlled rectifier, and a thermal switch connected in parallel with said silicon-controlled rectifier.

9. A circuit for rapidly charging a battery form an alternating-current voltage source comprising a first current path between the source and the battery to be charged, a unilateral impedance element connected in said path, said unilateral impedance element having a control terminal for the application of a triggering current, said unilateral impedance element being responsive to smaller trigger currents as its temperature increases and larger trigger currents as it decreases, a thermal switch connected in parallel with said impedance element, means for clamping the control terminal at a selected voltage related to the normal output of the battery being charged, so that the increase in quiescent battery terminal voltage as charge progresses is compared to the selected voltage and causes the current through the element to decrease, with a consequent decrease in the temperature of the element for a regenerative termination of rapid charging.

10. A battery charger for imparting a progressively increasing charge to a battery having one or more cells from an alternating-current voltage source by subjecting the battery to alternating charging and discharging intervals after a first interval, the charger comprising a charge current path from the source to the battery, a unilateral impedance element connected in the first current path, and a charge-discharge current path intermittently connected in parallel with the charge current path for intermittently discharging the battery.

11. A battery charger in accordance with claim 10 wherein the charge-discharge path comprises a thermal-responsive switch connected across the unilateral impedance element of the charge current path, the thermal switch having a thermal characteristic such that it is open substantially longer than it is closed.

12. A battery charger in accordance with claim 11 wherein the unilateral impedance element is a silicon-controlled rectifier having a resistor connected between its anode and gate and its cathode connected to the positive terminal of the battery to be charged.

13. A battery charging circuit for imparting progressively increasing charge to a battery having one or more cells from an alternating-current voltage source providing charging current in excess of the nominal 1-hour rate of the cells of the battery being charged by subjecting said battery to alternating charging and discharging intervals, said circuit comprising a first path for conducting direct current from the source to the battery and a second path in parallel with the first path for discharging the battery, the second path including circuit means responsive to current therethrough for intermittently opening the second path for an interval of time substantially longer than the interval of time during which the path is closed.

* * * * *

PO-1050
(5/69)

UNITED STATES PATENT OFFICE
CERTIFICATE OF CORRECTION

Patent No. 3,626,270                    Dated December 7, 1971

Inventor(s) Wilford B. Burkett and John H. Bigbee III

It is certified that error appears in the above-identified patent and that said Letters Patent are hereby corrected as shown below:

Col. 2, line 26, change "voltages" to --voltage--.
Col. 4, line 44, change "cure" to --curve--.
Col. 5, line 16, change "flow" to --flows--.
Col. 5, line 51, after "cathode" insert --voltage--.
Col. 5, line 63, after "place" delete --of--.
Col. 8, line 3, change "form" to --from--.
Col. 8, line 13, after "output" insert --voltage--.
Col. 8, line 48, after "current" insert --flow--.

Signed and sealed this 30th day of May 1972.

(SEAL)
Attest:

EDWARD M. FLETCHER, JR.            ROBERT GOTTSCHALK
Attesting Officer                  Commissioner of Patents